US008068446B2

(12) United States Patent
Noh et al.

(10) Patent No.: US 8,068,446 B2
(45) Date of Patent: Nov. 29, 2011

(54) METHOD OF EFFICIENTLY PROCESSING DORMANT STATE IN PACKET SERVICE AND MULTI-MODE TERMINAL FOR THE SAME

(75) Inventors: Jeong-Min Noh, Seoul (KR); Ho-Joong Kim, Yongin-si (KR)

(73) Assignee: Samsung Electronics Co., Tld (KR)

( * ) Notice: Subject to any disclaimer, the term of this patent is extended or adjusted under 35 U.S.C. 154(b) by 750 days.

(21) Appl. No.: 11/652,382

(22) Filed: Jan. 11, 2007

(65) Prior Publication Data

US 2007/0177617 A1 Aug. 2, 2007

(30) Foreign Application Priority Data

Jan. 27, 2006 (KR) .......................... 10-2006-0009068

(51) Int. Cl.
*G08C 17/00* (2006.01)
(52) U.S. Cl. ........................................ 370/311; 455/436
(58) Field of Classification Search .................. 370/311, 370/401, 352, 458, 320, 331
See application file for complete search history.

(56) References Cited

U.S. PATENT DOCUMENTS

| | | | |
|---|---|---|---|
| 6,680,902 B1 * | 1/2004 | Hudson | 370/210 |
| 6,687,237 B1 * | 2/2004 | Lee et al. | 370/331 |
| 6,961,583 B2 * | 11/2005 | Moles et al. | 455/552.1 |
| 6,963,745 B2 * | 11/2005 | Singh et al. | 455/437 |
| 2002/0145990 A1 * | 10/2002 | Sayeedi | 370/335 |
| 2003/0035393 A1 * | 2/2003 | Sinnarajah et al. | 370/335 |
| 2003/0039231 A1 * | 2/2003 | Sinnarajah et al. | 370/335 |
| 2003/0166408 A1 * | 9/2003 | Zhang et al. | 455/522 |
| 2003/0193923 A1 * | 10/2003 | Abdelgany et al. | 370/342 |
| 2004/0114553 A1 * | 6/2004 | Jiang et al. | 370/328 |
| 2004/0121804 A1 * | 6/2004 | Yukie et al. | 455/557 |
| 2005/0128980 A1 * | 6/2005 | Han et al. | 370/331 |
| 2006/0034228 A1 * | 2/2006 | Kim et al. | 370/335 |
| 2007/0049274 A1 * | 3/2007 | Yacobi et al. | 455/436 |
| 2007/0064648 A1 * | 3/2007 | Kim et al. | 370/331 |
| 2007/0177617 A1 * | 8/2007 | Noh et al. | 370/401 |

FOREIGN PATENT DOCUMENTS

| | | |
|---|---|---|
| CN | 1725901 | 1/2006 |
| KR | 1020020014566 A | 2/2002 |
| KR | 1020050033668 A | 4/2005 |
| KR | 1020050034492 A | 4/2005 |
| KR | 1020050035381 A | 4/2005 |
| KR | 1020060013012 A | 2/2006 |
| KR | 1020060038689 A | 5/2006 |

* cited by examiner

*Primary Examiner* — Jean A Gelin
*Assistant Examiner* — Nathan Taylor
(74) *Attorney, Agent, or Firm* — The Farrell Law Firm, P.C.

(57) ABSTRACT

An apparatus and method for efficiently processing a dormant state in a packet service between communication networks providing the packet service using different mobile communication technologies is disclosed. This method includes disconnecting, by a multi-mode terminal, a current packet call and changing to a new serviceable mode, if a multi-mode terminal moves to a poor communication area in a dormant or preservation state occurring during a packet service. In this state, by immediately returning to a packet call reconnection state if a user performs a subsequent operation, an area in which the packet service cannot be provided can be minimized, and a communication mode in which a best communication service can be provided can be established.

14 Claims, 8 Drawing Sheets

METHOD OF EFFICIENTLY PROCESSING DORMANT STATE IN PACKET SERVICE AND MULTI-MODE TERMINAL FOR THE SAME

PRIORITY

This application claims priority under 35 U.S.C. §119 to an application entitled "Method of Efficiently Processing Dormant State in Packet Service and Multi-Mode Terminal for The Same" filed in the Korean Intellectual Property Office on Jan. 27, 2006 and assigned Serial No. 2006-9068, the contents of which are incorporated herein by reference.

BACKGROUND OF THE INVENTION

1. Field of the Invention

The present invention relates generally to a method of efficiently processing a dormant state in a packet service between communication networks providing the packet service using different mobile communication techniques and a multi-mode terminal for the same.

2. Description of the Related Art

Recently, mobile communication networks are being upgraded from second generation (2G) networks, such as code division multiple access (CDMA) networks and Europe global systems for mobile communication (GSM) networks, to third generation (3G) networks such as wideband CDMA (WCDMA) networks. To efficiently and conveniently use 3G networks, the 3G networks should be installed to cover as wide an area as possible (e.g., nation wide). However, since 2G networks are widely installed and used at the present, it is difficult to remove the 2G networks at the same time. Thus, while infrastructures of the 2G networks are transitionally used, areas in which the 3G networks are installed are gradually widened usually from portions of metropolitan areas.

In this state, since it is economical in terms of service to mix a 2G CDMA scheme and a 3G WCDMA scheme, terminals supporting WCDMA are manufactured as multi-mode terminals for supporting CDMA and WCDMA. Distinguishable characteristics of these multi-mode terminals typically include an idle handover function for changing to a CDMA mode or a WCDMA mode, a traffic handover function for seamlessly changing to the CDMA mode when a multi-mode terminal moves to a WCDMA shadow area while talking, and a packet call reconnection function for reconnecting a packet type data call by changing to the CDMA mode or the WCDMA mode. Although the method of mixing the CDMA scheme and the 3G WCDMA scheme is convenient and economical because existing 2G CDMA networks may be used if necessary, since the multi-mode terminals must quickly change a mode and perform a handover and reconnection, hardware and software of the multi-mode terminal is usually more complicated than that of a single-mode terminal.

Mobile communication providers desire to introduce techniques for increasing utilization of a wireless network and decreasing an access costs. Despite a cellular provider's best efforts to reduce costs, conventional access techniques may still be prohibitively expensive. For example, if a packet service is used for a relatively long time, a service charge for the packet service may become problematic because of service/access charges. To solve this problem, a technique of maintaining a terminal in a dormant state while real data transmission or reception is not performed has been developed.

Dormant indicates a technique of maintaining an idle state when data transmission or reception is not performed between a Web browser of a terminal and a server and returning to an access state when a user demand is input. For a packet call, a state in which an application using the packet call is operating but not transmitting or receiving data to or from a wireless network is called a dormant or preservation state.

Typically, when a component managing a radio link of a terminal or a system uses a timer and determines that no data is transmitted to or received from a wireless network for a predetermined time, a dormant state is activated. If the dormant state is activated, a mobile communication provider releases the radio link to save wireless resources and stores only an Internet protocol (IP) address required to receive a packet call service and quality of service (QoS) indicating a grade of service of a user. After the timer is reset, if no data is transmitted to or received from the wireless network for a predetermined time, an operating application is terminated, and the stored IP address and QoS information are deleted.

FIG. 1 is a conceptual diagram of areas in which conventional CDMA and WCDMA network systems are installed. Referring to FIG. 1, if a multi-mode terminal 50 moves to a CDMA exclusive area 10 while operating in a WCDMA mode in a WCDMA network area (e.g., areas 20, 30, and/or 40), i.e., an overlay area, since the multi-mode terminal 50 cannot connect to any WCDMA base transceiver station (BTS), the multi-mode terminal 50 searches for a CDMA BTS, and if a CDMA BTS is found, the multi-mode terminal 50 changes from the WCDMA mode to a CDMA mode and terminates a handover. On the contrary, if the multi-mode terminal 50 moves to the overlay area, the multi-mode terminal 50 operating in the CDMA mode performs a handover to change to the WCDMA mode according to a predetermined condition. Even if a GSM network is used instead of a WCDMA network, the same procedures as described above are performed.

However, since the multi-mode terminal 50 cannot communicate with any BTS when moving to a shadow area or a boundary area in a dormant state, it is difficult for the multi-mode terminal 50 to return to a reconnection state (i.e., a previous state) even if the multi-mode terminal 50 attempts a reconnection.

A process of processing a dormant state in the WCDMA mode will now be described with reference to FIG. 2. In response to a packet service request from a user, a data application, i.e., a controller 120 transmits and receives data using a packet type path set through steps 200 to 220. If data transmission or reception is no longer performed, for example, after data communication is finished, a WCDMA BTS 100 activates a timer to determine whether the WCDMA BTS 100 begins a dormant state. If data transmission or reception is not performed until the timer expires, the WCDMA BTS 100 releases a radio link by transmitting a Radio Resource Control (RRC) CONNECTION RELEASE message to a WCDMA modem 110 in step 230. If the WCDMA modem 110 receives the RRC CONNECTION RELEASE message, the WCDMA modem 110 determines that the dormant state has begun and transmits a DORMANT INDICATION message to the controller 120 in step 235.

However, a terminal maintains IP address and QoS information obtained through ACTIVATE Packet Data Protocol (PDP) CONTEXT procedures of steps 210 and 215 and does not terminate a relevant application. Thereafter, the WCDMA BTS 100 activates a dormant timer, and if no data communication is performed with the WCDMA modem 110 until the dormant timer expires, the WCDMA BTS 100 deletes the IP address and QoS information allocated to the terminal through DEACTIVATE PDP CONTEXT procedures of steps 240 to 245. In step 250, the WCDMA modem 110 transmits a CALL DISCONNECT message to the controller 120 to terminate the relevant application in use.

As described above, even though the terminal moves to a shadow or boundary area in the dormant state, the WCDMA BTS 100 cannot process a service from a WCDMA network, such as an incoming call or a short message, until the dormant timer expires.

A process of processing a dormant state in the CDMA mode will now be described with reference to FIG. 3. Similar to the WCDMA mode, in the CDMA mode, if a wireless data transmission or reception is finished and/or no longer performed after a packet bearer is established in step 320, the CDMA BTS 140 activates a timer to determine whether the CDMA BTS 140 begins a dormant state. For example, when a user accesses a certain site using the terminal, if the user does not act further until the timer expires in order to obtain more information after data communication for displaying a screen image is finished, a connection between the terminal and the CDMA BTS 140 is temporarily terminated. If no data is transmitted or received through a CDMA modem 130, the CDMA BTS 140 releases a radio link by transmitting a RELEASE ORDER message to the CDMA modem 130 in step 325. Steps 300-320 include conventional origination techniques and are not discussed here for the sake of clarity.

If the CDMA modem 130 receives the RELEASE ORDER message in step 325, the CDMA modem 130 determines that the dormant state begins from the moment the message is received and transmits a DORMANT INDICATION message for indicating the dormant state to the controller 120 in step 330. However, the terminal maintains previously obtained IP address and QoS information and does not terminate a relevant application. Thereafter, the CDMA modem 130 activates a dormant timer, and if no data communication is performed with the CDMA BTS 140 until the dormant timer expires, the CDMA modem 130 deletes the allocated IP address and QoS information and transmits a CALL DISCONNECT message to the controller 120 in step 335 to terminate the relevant application in use.

As described above, in the dormant state, even though a terminal moves to a shadow or boundary area, when a dormant timer expires, after terminating a relevant application and returning to a stand-by state, the terminal tries a mode change by determining whether a current area is the shadow or boundary area. Thus, in the dormant state, the terminal must wait without processing a message received from a network until the dormant timer expires. In addition, in the CDMA mode, the terminal determines whether a mode change is performed by periodically checking a WCDMA overlay bit included in a system parameter message. However, in the dormant state, even though a condition for a mode change is satisfied, the terminal must maintain the CDMA mode without changing to the WCDMA mode until the dormant timer expires.

SUMMARY OF THE INVENTION

An object of the present invention is to substantially solve at least the above problems and/or disadvantages and to provide at least the advantages below. Accordingly, an object of the present invention is to provide a method of efficiently processing a dormant state in a packet service between communication networks providing the packet service and a multi-mode terminal for the same.

According to one aspect of the present invention, there is provided a method of efficiently processing a dormant state in a packet service, which is performed by a multi-mode terminal having first and second modems supporting different communication services, the method including if it is recognized that the multi-mode terminal enters into the dormant state during a packet service through a first communication network, monitoring whether a communication state with the first communication network is bad (i.e., fall below a threshold value) in the dormant state; if it is determined that the communication state with the first communication network is bad, requesting the first communication network to disconnect a packet call; and when the packet call with the first communication network is disconnected, performing the packet service by connecting a packet call to a second communication network.

According to another aspect of the present invention, there is provided a multi-mode terminal, including first and second modems supporting different communication services, for efficiently processing a dormant state in a packet service, the first modem for monitoring whether a communication state with a first communication network is bad (i.e., fall below a threshold value) in the dormant state upon recognizing that the multi-mode terminal has entered into the dormant state during a packet service through the first communication network, requesting the first communication network to disconnect a packet call if the communication state with the first communication network is determined to be bad, and commanding the second modem to perform the packet service by connecting a packet call to a second communication network if the packet call with the first communication network is disconnected in response to the disconnect request; and the second modem for registering into the second communication network in response to the command from the first modem and performing the packet service by connecting the packet call to the second communication network if the registration succeeds.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENT

Figure 1:
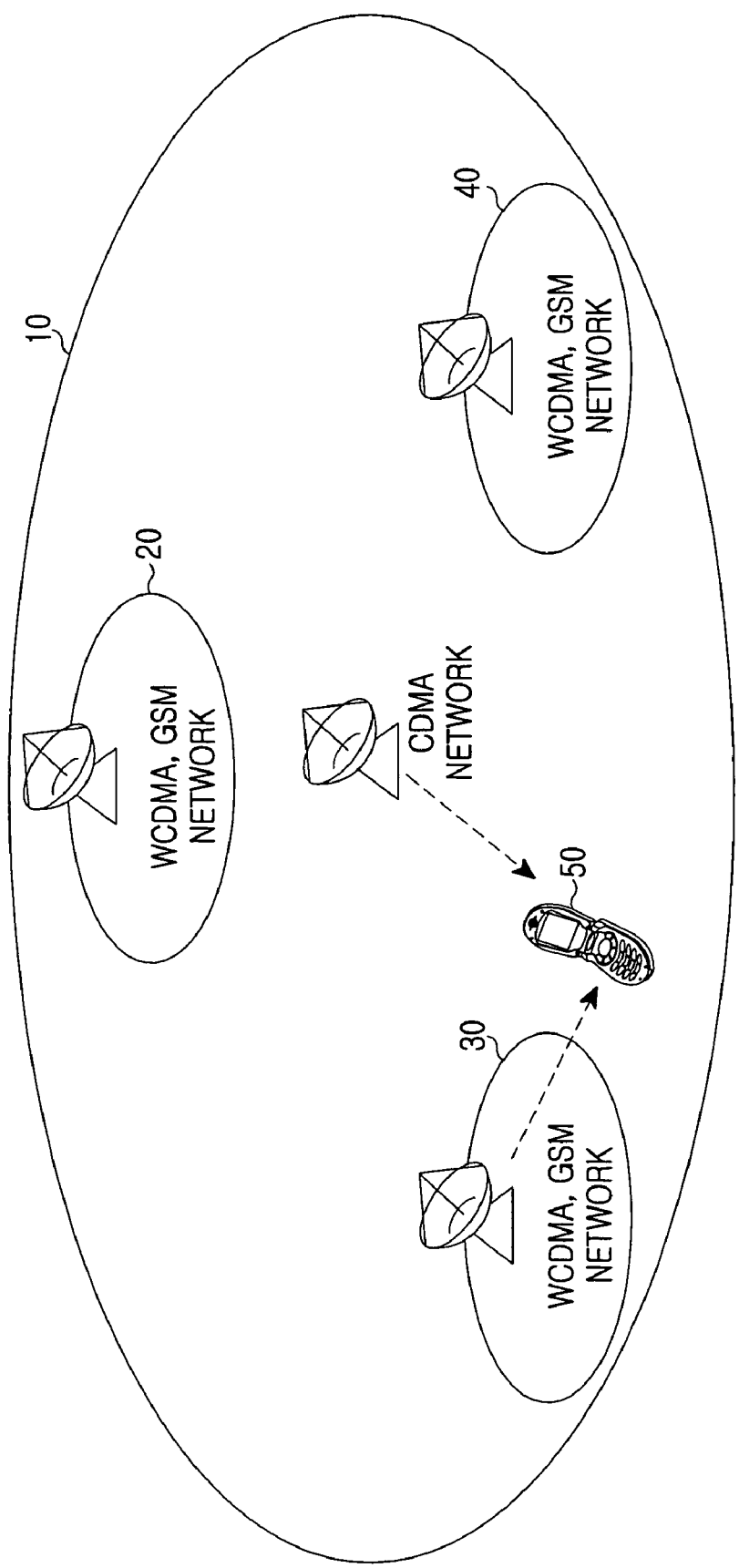
FIG. 1 is a block diagram of areas in which conventional CDMA and WCDMA network systems are installed.
Figure 2:
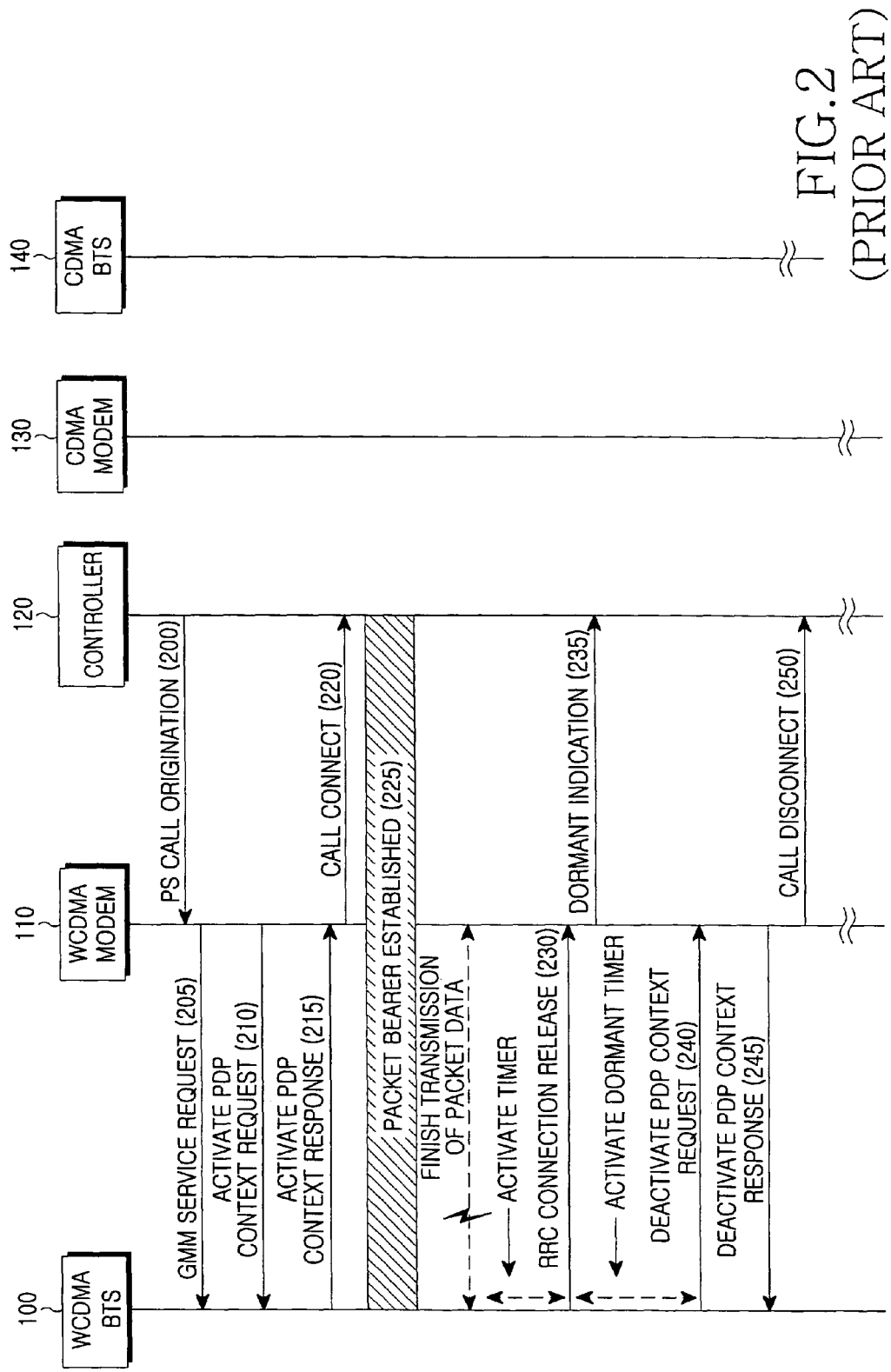
FIG. 2 is a flow diagram illustrating a process of processing a dormant state in a conventional WCDMA mode.
Figure 3:
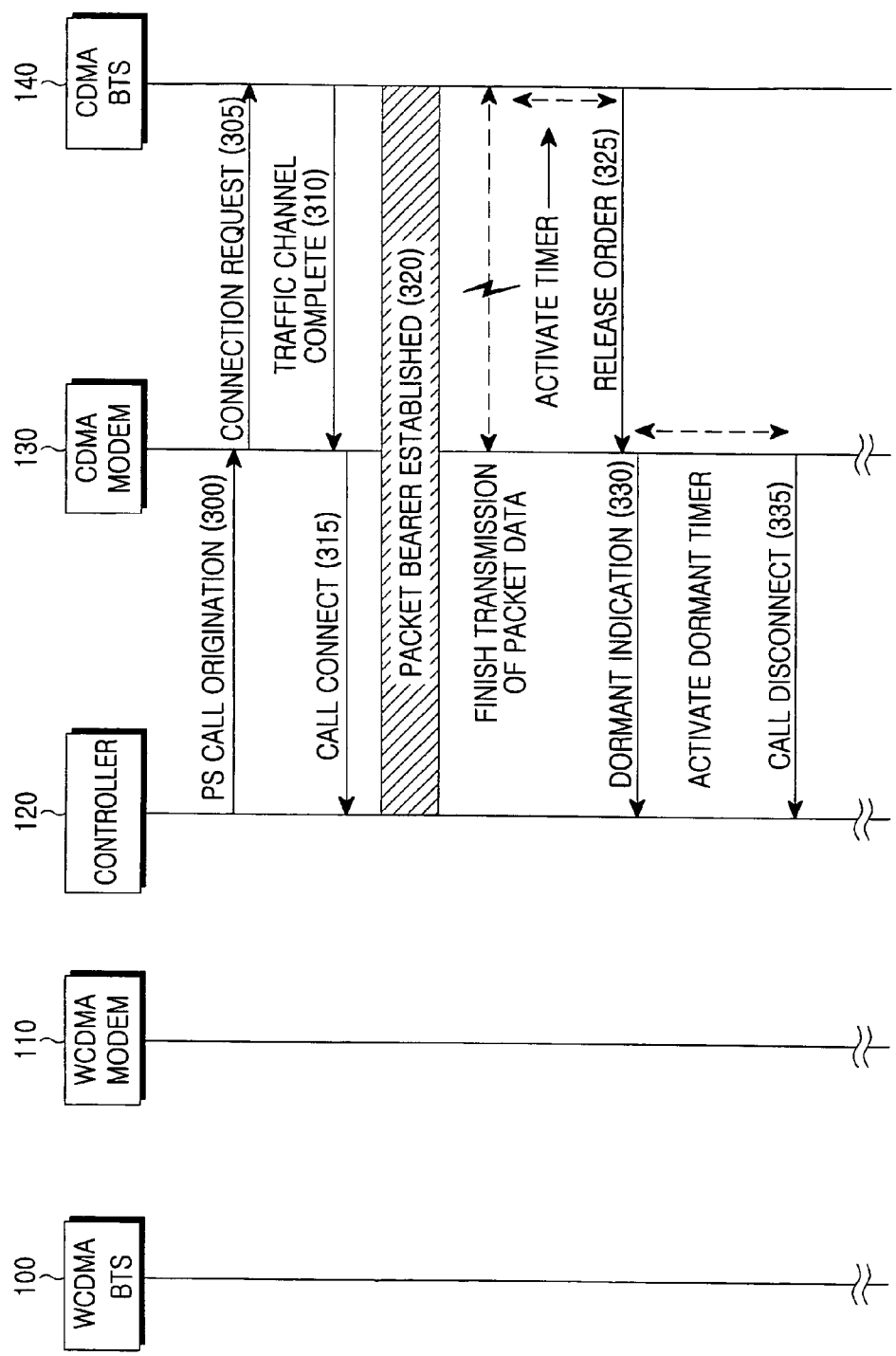
FIG. 3 is a flow diagram illustrating a process of processing a dormant state in a conventional CDMA mode.

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

The present invention implements a function of efficiently processing a dormant state in a packet service between communication networks providing the packet service using different mobile communication technologies. To do this, if a multi-mode terminal moves to a bad communication area (i.e., a communication area whose service fails below a predetermined threshold value) in a dormant or preservation state during a packet service, the multi-mode terminal disconnects a current packet call and changes to a serviceable mode. Examples of the bad communication area are a shadow area, a boundary area, and/or an overlay area. Thereafter, if a user performs a subsequent operation, the multi-mode terminal can minimize an unserviceable time period by immediately returning to a packet call reconnection state and find a communication mode in which the best service can be provided. The multi-mode terminal is a terminal supporting different mobile communication technologies from among CDMA, WCDMA, GSM, and general packet radio service (GPRS).

Components of the multi-mode terminal and their operations according to a the present invention in which the above-described function is realized will now be described with reference to FIG. 4. In particular, for the sake of clarity, CDMA and WCDMA are illustrated as the different mobile communication technologies, and more particularly, a handover operation from a WCDMA mode to a CDMA mode will be described. However, according to the present invention, these and/or combinations of other communication technologies may be used. Herein, the multi-mode terminal can use two different mobile communication technologies from among CDMA, WCDMA, GSM, and GPRS.

For example, the multi-mode terminal supports the WCDMA mode and the CDMA mode according to the present invention, the multi-mode terminal includes a WCDMA modem 450 and a CDMA modem 440 for operating in respective modes. The CDMA modem 440 and the WCDMA modem 450 are connected through a communication path 460 for intercommunication. Likewise, if other communication technologies are used, then the multi-mode terminal would include corresponding modems.

In detail, the multi-mode terminal includes an antenna (ANT) for transmitting and receiving a WCDMA signal and a CDMA signal, a duplexer 410 for separating the WCDMA signal and the CDMA signal transmitted and received through the antenna, a CDMA radio frequency (RF) module 420 and a WCDMA RF module 430 for processing the CDMA signal and the WCDMA signal, respectively, and the CDMA modem 440 and the WCDMA modem 450 for processing the CDMA signal and the WCDMA signal transmitted and received through the CDMA RF module 420 and the WCDMA RF module 430, respectively. Each of the CDMA modem 440 and the WCDMA modem 450 may include individual a modem chips may be both integrated on a single chip and/or a digital signal processor (DSP) in the modem chip. Likewise, other construction techniques and method may be used.

Figure 4:
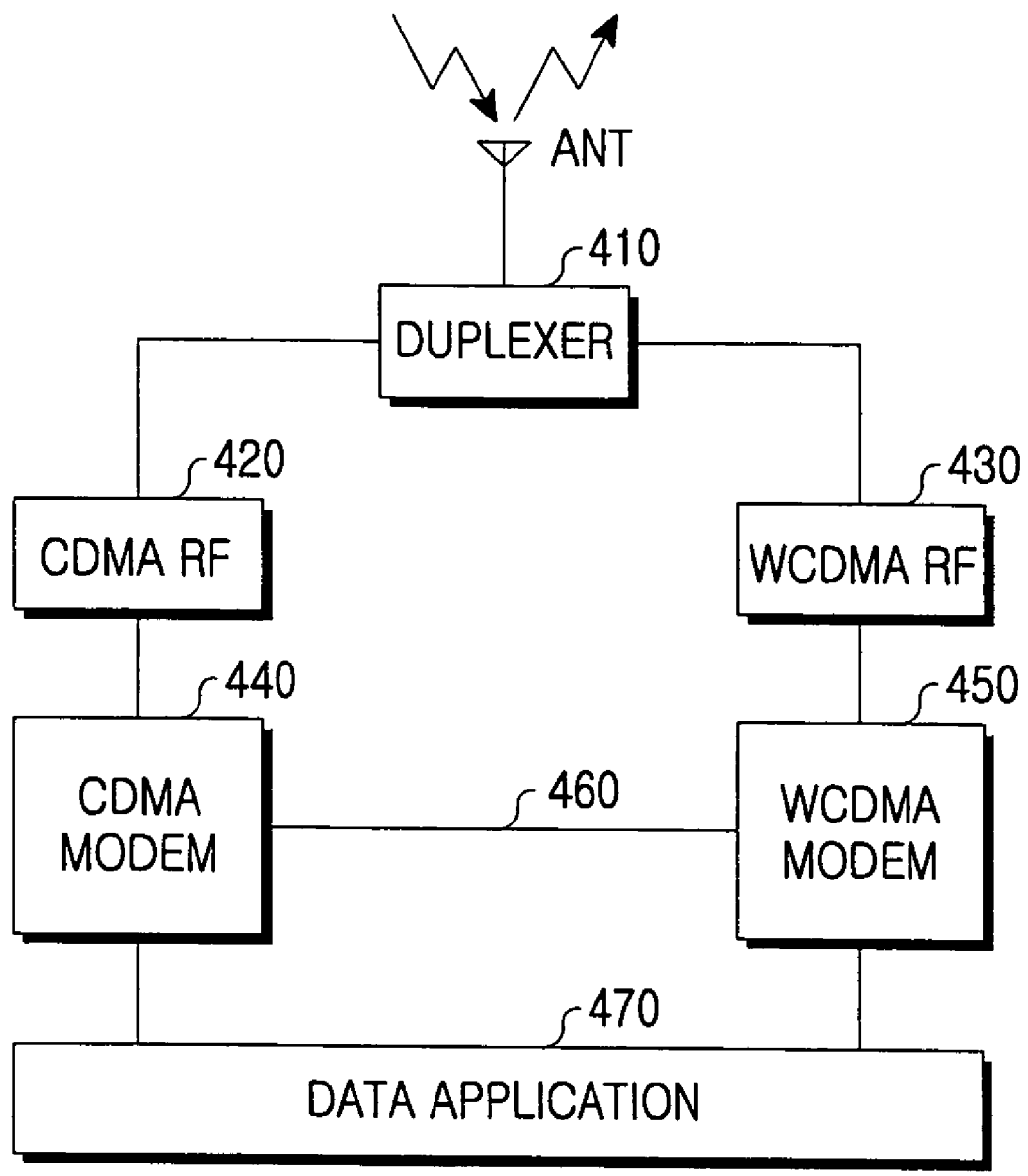
FIG. 4 is a block diagram of a multi-mode terminal according to a the present invention.

A multi-mode terminal structure of FIG. 4 illustrates components that may be used for a single antenna system. Thus, if the multi-mode terminal having the structure illustrated in FIG. 4 is located in a WCDMA network, only the CDMA RF module 420 is temporarily in a power-off state, and the antenna, the duplexer 410, the WCDMA RF module 430, and the WCDMA modem 450 are in a power-on state. Thus, the multi-mode terminal operates in the WCDMA mode. If the multi-mode terminal is located in a CDMA network, since only the WCDMA RF module 430 is temporarily in the power-off state, and the multi-mode terminal operates in the CDMA mode. In this case, the WCDMA modem 450 plays a role of a processor for communicating with a user by receiving data from the CDMA modem 440 through the communication path 460.

As illustrated in FIG. 4, since the multi-mode terminal does not include an application processor for tuning the two modems 440 and 450, one of the two modems 440 and 450 must play a role of a master. Typically, the WCDMA modem 450 plays a role of the master and a role of a user interface provided by a typical application processor. Accordingly, the CDMA modem 440 operates under the control of the WCDMA modem 450, which is a master modem.

A data application 470 receives data for a screen display from a relevant BTS through one of the two modems 440 and 450 or transmits data input by the user. That is, the data application 470 is an application for data communication.

As described above, in the current embodiment, by realizing the internal communication path 460 for 1:1 communication between the CDMA modem 440 and the WCDMA modem 450, when the dormant or preservation state occurs during a packet service, intercommunication between the CDMA modem 440 and the WCDMA modem 450 can be performed. That is, since the WCDMA modem 450 can directly transmit a command to the CDMA modem 440, an additional application processor, i.e., a controller, for controlling the two modems 440 and 450 is not required. Thus, to operate in a relevant mode, each of the two modems 440 and 450 includes a user interface part and a device control part. Accordingly, the WCDMA modem 450 and the CDMA modem 440 operate as a master and a slave, respectively.

Hereinafter, processes for efficiently processing the dormant state in the multi-mode terminal having the above-described structure are described.

Figure 5:
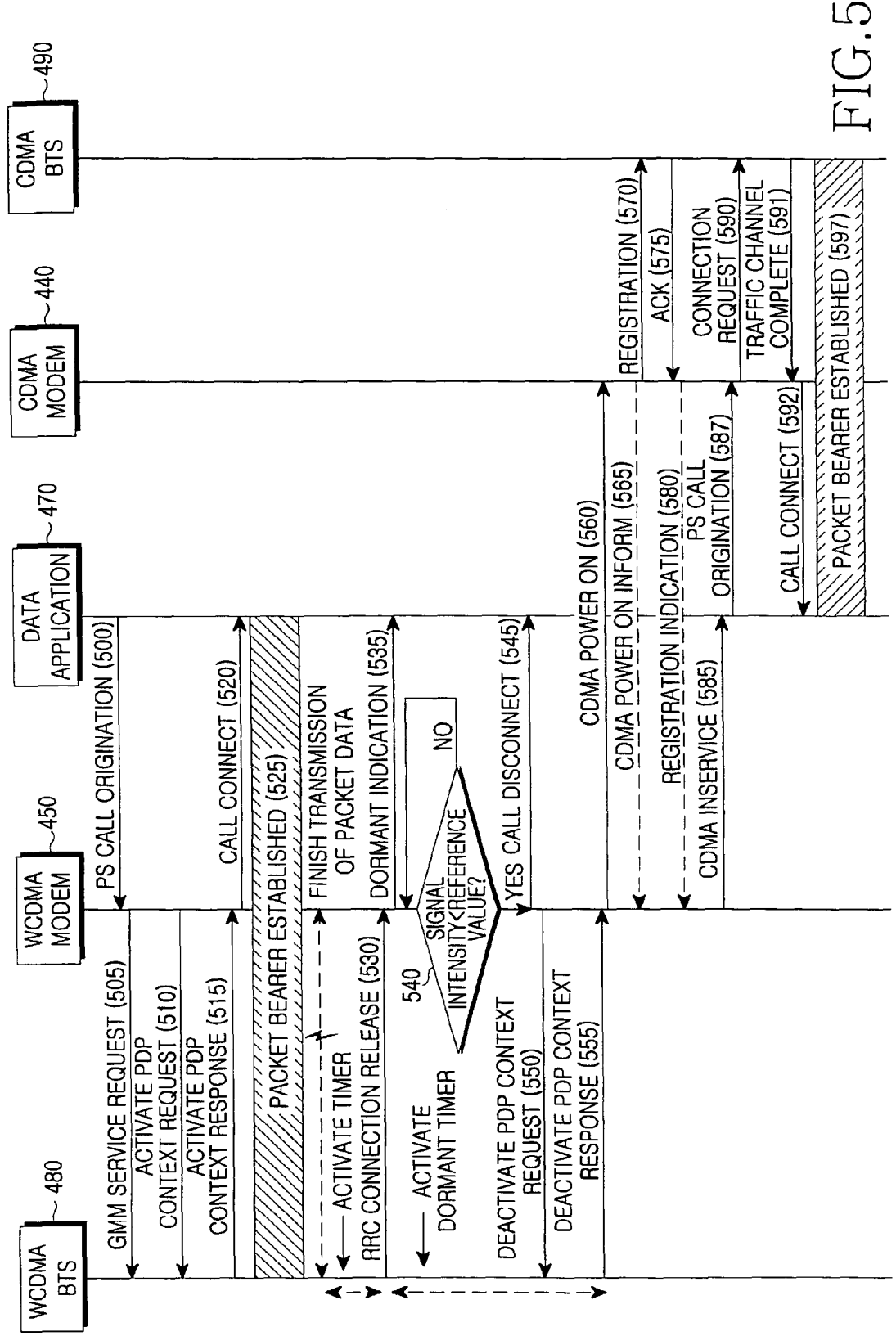
FIG. 5 is a signaling diagram illustrating a process of processing a dormant state in a WCDMA mode according to a the present invention.

FIG. 5 is a flow diagram illustrating a process of processing the dormant state in the WCDMA mode according to the present invention. In FIG. 5, a case where the multi-mode terminal operating in the WCDMA mode moves to a bad communication area is illustrated.

Referring to FIG. 5, in response to a packet service connection request from the user, the data application 470 transmits a Packet-Switched (PS) CALL ORIGINATION message to the WCDMA modem 450 in step 500. In step 505, the WCDMA modem 450 transmits a GPRS Mobility Management (GMM) SERVICE REQUEST message to a WCDMA BTS 480. To transmit and receive packet data, a PDP context must be active between the multi-mode terminal and the WCDMA BTS 480. That is, the PDP context must be active for the multi-mode terminal to perform packet data communication with a server (not shown) providing a specific packet service through the WCDMA BTS 480 in response to a packet service request from the user. Thus, the WCDMA modem 450 transmits an ACTIVATE PDP CONTEXT REQUEST message to the WCDMA BTS 480 in step 510, and if the WCDMA modem 450 receives an ACTIVATE PDP CONTEXT RESPONSE message from the WCDMA BTS 480 in step 515, the WCDMA modem 450 informs that a packet call is connected by transmitting a CALL CONNECT message to the data application 470 in step 520. Since the ACTIVATE PDP CONTEXT RESPONSE message contains IP address and QoS information, when the ACTIVATE PDP CONTEXT RESPONSE message is received, a packet service starts by establishing a packet type path (packet bearer)

using the assigned IP address in step 525. That is, the data application 470 wirelessly transmits and receives data to and from the WCDMA BTS 480.

If no data is transmitted or received during predetermined time period in the data communication, the WCDMA BTS 480 activates a timer to determine whether to enter into the dormant state. In the data communication, if a certain terminal always occupies a plurality of channels, frequency efficiency is lowered, thereby generating a bad communication state. Thus, a dormant function is used to allow other users to use wireless resources without delay by releasing unused wireless resources. If no data is transmitted or received to or from the multi-mode terminal until the timer expires, the WCDMA BTS 480 releases a radio link by transmitting an RRC. CONNECTION RELEASE message to the WCDMA modem 450 in step 530 and activates a dormant timer.

If the RRC CONNECTION RELEASE message is received, the WCDMA modem 450 considers that the dormant state has begun and transmits a DORMANT INDICATION message to the data application 470 in step 535. However, the multi-mode terminal maintains the IP address and QoS information assigned through the ACTIVATE PDP CONTEXT procedures of steps 510 and 515 and does not terminate a relevant application.

Accordingly, the present invention teaches a method of efficiently processing the dormant state to change to another mode even in the dormant state if the multi-mode terminal is located in a bad communication area without changing to another mode only after staying in a stand-by state after the dormant state ends. Therefore, the multi-mode terminal to which the present invention is applied may continuously perform the packet service by immediately returning to a reconnection state even if the user moves to a bad communication area in the dormant state. To determine whether the multi-mode terminal is located in a bad communication area, the WCDMA modem 450 checks whether a mode change command is set in a System Information Block (SIB) indicator broadcasted in a WCDMA network or measures reception signal intensity of a current wireless environment.

If the reception signal intensity is used, the WCDMA modem 450 monitors in step 540 whether current reception signal intensity is less than a pre-set reception signal intensity reference value. During the monitoring, the WCDMA BTS 480 is continuously operating a dormant timer until the dormant timer expires, and the process of processing the dormant state according to the may be performed before the dormant timer in the WCDMA BTS 480 expires. If it is determined that the current reception signal intensity is less than the pre-set reception signal intensity reference value, the WCDMA modem 450 transmits a CALL DISCONNECT message to the data application 470 in step 545. In steps 550 and 555, next, the WCDMA modem 450 performs DEACTIVATE PDP CONTEXT procedures for disconnecting from the WCDMA BTS 480. In step 550, the WCDMA modem 450 transmits a DEACTIVATE PDP CONTEXT REQUEST message to the WCDMA BTS 480. If the WCDMA modem 450 receives a DEACTIVATE PDP CONTEXT RESPONSE message from the WCDMA BTS 480 in step 555, the WCDMA modem 450 deletes the assigned IP address and QoS information and performs an initialization process. As described above, if the WCDMA modem 450 determines that the multi-mode terminal is located in a bad communication area, the WCDMA modem 450 changes a mode by directly disconnecting the packet call with the WCDMA BTS 480 in order to quickly the dormant state without waiting until the dormant timer in the WCDMA BTS 480 expires.

To perform the mode change, the WCDMA modem 450 transmits a CDMA POWER ON message for turning on the CDMA modem 440 to the CDMA modem 440 through the communication path 460 in step 560. If the CDMA POWER ON message is received, the CDMA modem 440 performs an initialization process and transmits a CDMA POWER ON INFORM message for informing of the power-on to the WCDMA modem 450 in step 565. In steps 570 and 575, the CDMA modem 440 performs system registration using a conventional method. That is, the CDMA modem 440 transmits a REGISTRATION message for CDMA network registration to a CDMA BTS 490 in step 570, and if an ACK message is received in step 575 in response to the REGISTRATION message, the CDMA modem 440 determines that CDMA network registration has been successfully performed. When the multi-mode terminal was registered in a CDMA network, the CDMA modem 440 transmits a REGISTRATION INDICATION message for indicating completion of registration to the WCDMA modem 450 in step 580.

In step 585, the WCDMA modem 450 transmits a CDMA INSERVICE message for informing of movement into the CDMA network to the data application 470 in step 585. In step 587, the data application 470 transmits a PS CALL ORIGINATION message to the CDMA modem 440. Then, the CDMA modem 440 performs a packet call connection with the CDMA BTS 490. To do this, if the CDMA modem 440 transmits a CONNECTION REQUEST message for connecting a packet call to the CDMA BTS 490 in step 590, in response to the CONNECTION REQUEST message, the CDMA BTS 490 performs operations, such as assignment of an IP address for the packet call connection, and transmits a TRAFFIC CHANNEL COMPLETE message for informing of completion of a channel connection for packet data transmission to the CDMA modem 440 in step 591. Then, a packet type path (packet bearer) is established in step 597 by the CDMA modem 440 transmitting a CALL CONNECT message for indicating a packet call connection to the data application 470 in step 592. By doing this, the packet service stopped when the (packet call) with the WCDMA BTS 480 was disconnected is packet call reconnected to the CDMA BTS 490. That is, when the user accesses a certain site using the multi-mode terminal, even though the user moves to a bad communication area in a dormant state after data transmission and reception for a screen display is performed, since the multi-mode terminal changes to a new mode, the multi-mode terminal can be in a serviceable reconnection state when the user performs a subsequent action.

Figure 6:
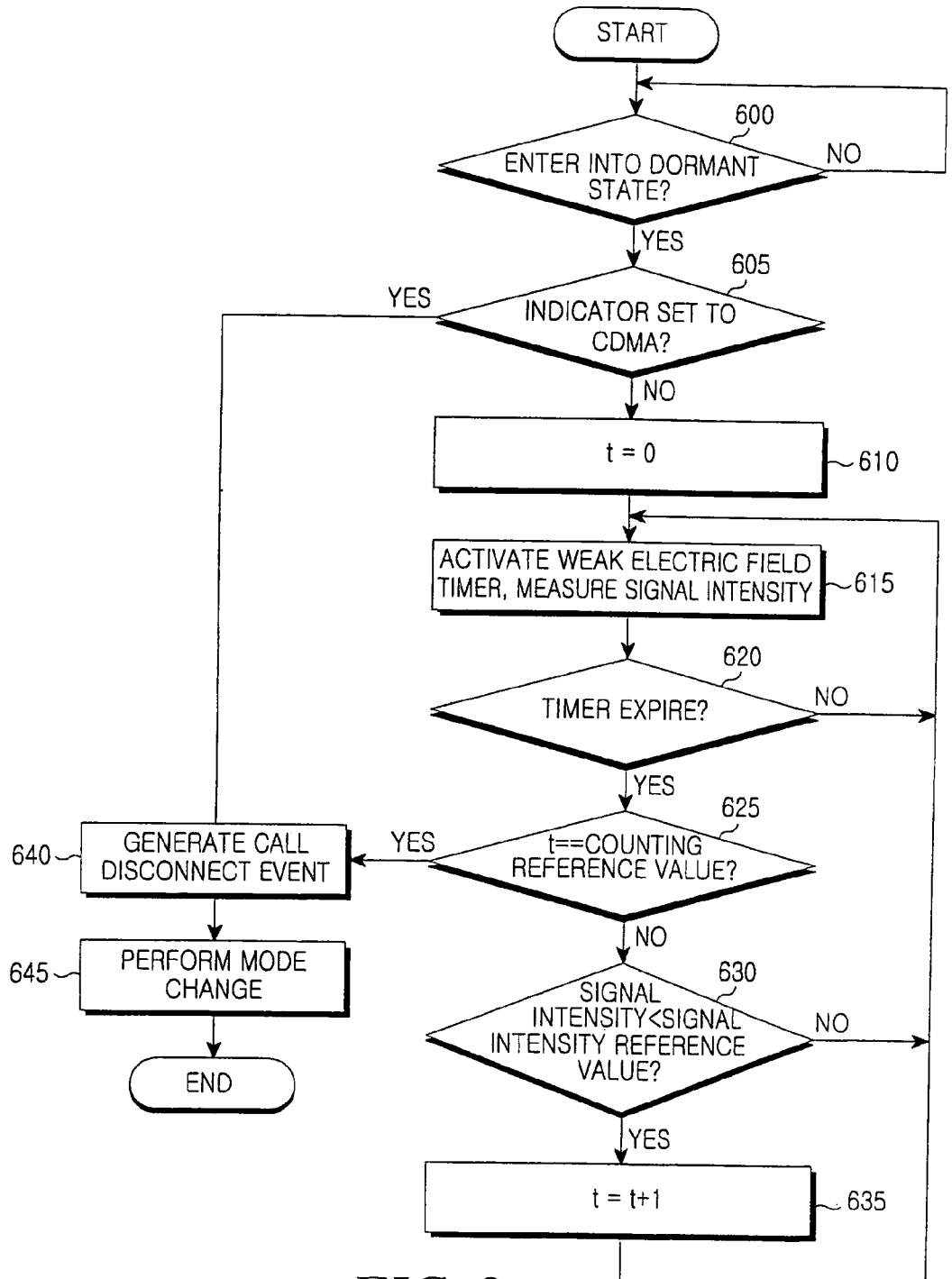
FIG. 6 is a flowchart illustrating a method of processing a dormant state in the WCDMA mode in the multi-mode terminal of FIG. 4 according to the present invention.

FIG. 6 is a flowchart illustrating a method of processing a dormant state in the WCDMA mode in the multi-mode terminal of FIG. 4 according to the present invention.

Referring to FIG. 6, the multi-mode terminal determines in step 600 whether the multi-mode terminal enters into the dormant state in which no data is transmitted or received for a predetermined time after data transmission and reception is finished after connecting to a packet service. If, in step 600, it is determined that the multi-mode terminal has entered the dormant state, the multi-mode terminal checks a WCDMA and CDMA indicator included in a SIB broadcasted in a WCDMA network and determines in step 605 whether the indicator is set to CDMA. If it is determined that the indicator is set to CDMA, the multi-mode terminal generates a call disconnect event in step 640. That is, a CALL DISCONNECT message is transmitted to the data application 470. Then, the multi-mode terminal performs a mode change in step 645. The mode change is performed as illustrated in steps 550 to 597 of FIG. 5.

If it is determined that the indicator is not set to CDMA in step 605, the multi-mode terminal initializes a signal intensity counter variable t to 0 in step 610 and measures reception signal intensity while activating a weak electric field timer in step 615. The weak electric field timer operates in a second basis, and the multi-mode terminal determines in step 620 whether the weak electric field timer expires. When the weak electric field timer expires, the multi-mode terminal determines in step 625 whether the signal intensity counter variable t is equal to a signal intensity counter reference value. If the signal intensity counter variable t is not equal to the signal intensity counter reference value, the multi-mode terminal determines in step 630 whether current reception signal intensity is less than a reception signal intensity reference value. If the current reception signal intensity is less than the reception signal intensity reference value, the multi-mode terminal increases the signal intensity counter variable t by 1 in step 635, and this process goes to step 615. The weak electric field timer is activated to measure reception signal intensity in a predetermined period. Thus, every time the weak electric field timer expires, measured reception signal intensity is compared to the reception signal intensity reference value. If the signal intensity counter variable t is equal to the signal intensity counter reference value in step 625 by repeating steps 615 to 635, the multi-mode terminal generates a call disconnect event in step 640, transmits a CALL DISCONNECT message to the data application 470, deletes IP address and QoS information assigned through DEACTIVATE PDP CONTEXT procedures with the WCDMA BTS 480, and performs an initialization process.

Thereafter, the multi-mode terminal turns on the CDMA modem 440 and registers in a CDMA network using a REGISTRATION message. If the registration fails, the multi-mode terminal terminates the data application 470, and if the registration succeeds, a CDMA INSERVICE message is transmitted to the data application 470 to inform of activation of a CDMA service. Then, the data application 470 receives a packet service by reconnecting a packet call to the CDMA BTS 490 when a packet service request is input from the user.

Figure 7:
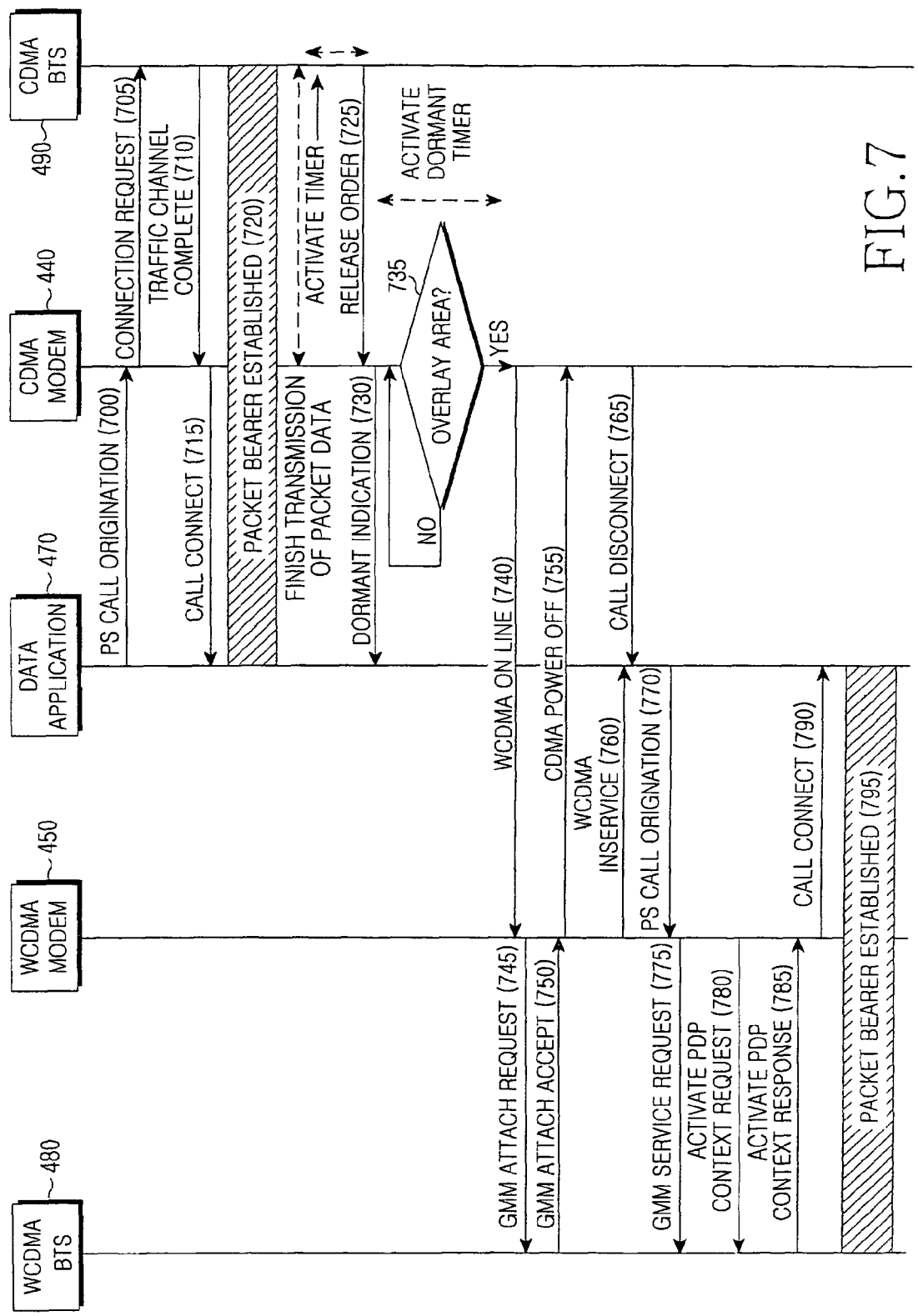
FIG. 7 is a signaling diagram illustrating a process of processing a dormant state in a CDMA mode according to the present invention.

FIG. 7 is a signaling diagram illustrating a process of processing the dormant state in the CDMA mode according to the present invention. In FIG. 7, a case where the multi-mode terminal operating in the CDMA mode moves to a bad communication area is illustrated.

Referring to FIG. 7, in response to a packet service connection request from the user, the data application 470 transmits a PS CALL ORIGINATION message to the CDMA modem 440 in step 700. Then, the CDMA modem 440 performs a packet call connection with the CDMA BTS 490. To do this, if the CDMA modem 440 transmits a CONNECTION REQUEST message for connecting a packet call to the CDMA BTS 490 in step 705, in response to the CONNECTION REQUEST message, the CDMA BTS 490 performs operations, such as assignment of an IP address for the packet call connection, and transmits a TRAFFIC CHANNEL COMPLETE message for informing of completion of a channel connection for packet data transmission to the CDMA modem 440 in step 710. Then, a packet type path (packet bearer) is established in step 720 by the CDMA modem 440 transmitting a CALL CONNECT message for indicating a packet call connection to the data application 470 in step 715.

In the CDMA mode, if data transmission and reception is finished while the data application is transmitting and receiving data to and from the CDMS BTS 490, the CDMA BTS 490 activates a timer to determine whether to enter into the dormant state. For example, when the user is watching a still screen shot, if data transmission and reception for displaying the still screen shot is finished, the multi-mode terminal views the same image unless the user selects another operation. In this case, transmission or reception of new data is temporarily not required.

In this state, if no data is received from the data application 470 or no new data to be transmitted exists until the timer expires, the CDMA BTS 490 releases a radio link by transmitting a RELEASE ORDER message to the CDMA modem 440 in step 725. In this case, the CDMA BTS 490 can delete assigned IP address and QoS information.

The CDMA modem 440, which has received the RELEASE ORDER message, determines that the dormant state has begun when the RELEASE ORDER message is received and transmits a DORMANT INDICATION message for indicating the dormant state to the data application 470 in step 730. However, the CDMA modem 440 maintains previously obtained IP address and QoS information and does not terminate a relevant application. In the dormant state, the CDMA modem 440 activates a dormant timer and determines in step 735 whether the multi-mode terminal is located in an overlay area. The CDMA modem 440 may also activate a ping-pong timer, and if a WCDMA network is found before the ping-pong timer expires, the CDMA modem 440 deactivates the dormant timer and performs an operation for changing to the WCDMA mode.

If it is determined that the multi-mode terminal is located in the overlay area in step 735, the CDMA modem 440 transmits a WCDMA ON LINE message for activating a WCDMA protocol to the WCDMA modem 450 through the communication path 460 in step 740. In steps 745 and 750, the WCDMA modem 450 performs a GMM connection process by transmitting a GMM ATTACH REQUEST message for location registration to the WCDMA BTS 480, and if the WCDMA modem 450 receives a GMM ATTACH ACCEPT message in response to the GMM ATTACH REQUEST message, the WCDMA modem 450 transmits a CDMA POWER OFF message for requesting power-off of the CDMA modem 440 to the CDMA modem 440 through the communication path 460 in step 755. In step 760, the WCDMA modem 450 transmits a WCDMA INSERVICE message for indicating a mode change to the WCDMA mode to the data application 470.

In step 765, the CDMA modem 440 transmits a CALL DISCONNECT message to the data application 470 to inform that the data application 470 should prepare to operate in the WCDMA mode. Then, the data application 470 transmits a PS CALL ORIGINATION message to the WCDMA modem 450 in step 770. In steps 775 to 795, the WCDMA modem 450 performs a packet call connection with the WCDMA BTS 480. Herein, since the procedures in steps 775 to 795 are typical, a detailed description therefore is omitted.

Figure 8:
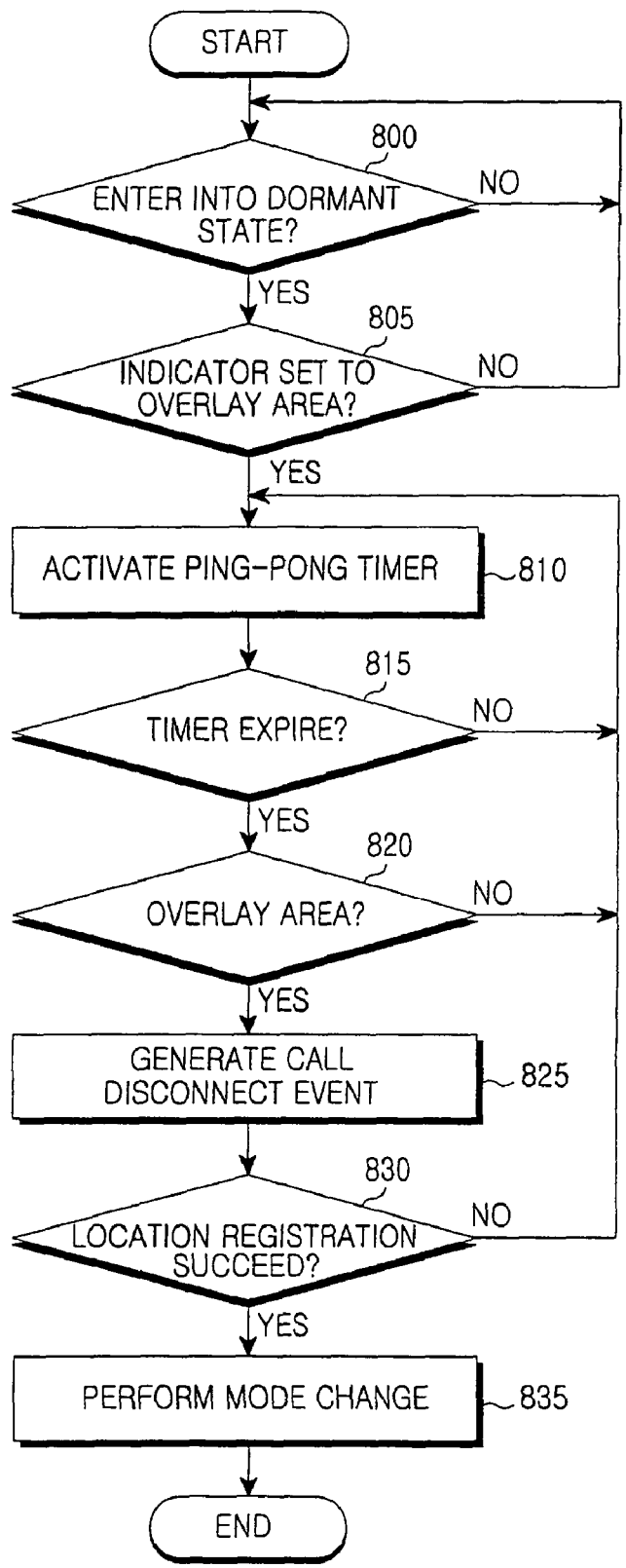
FIG. 8 is a flowchart illustrating a method of processing a dormant state in the CDMA mode in the multi-mode terminal of FIG. 4 according to the present invention.

FIG. 8 is a flowchart illustrating a method of processing the dormant state in the CDMA mode in the multi-mode terminal of FIG. 4 according to the present invention.

Referring to FIG. 8, the multi-mode terminal determines in step 800 whether the multi-mode terminal has entered into the dormant state in which no data is transmitted or received for a predetermined time after data transmission and reception is finished after connecting to a packet service. If it is determined that the multi-mode terminal has entered into the dormant state, the multi-mode terminal checks an indicator set in a specific bit of a base ID field included in a system parameter message. The indicator indicates a command for changing a current communication network mode to a new communication network mode if the multi-mode terminal is located in a bad communication area.

In step 805, the multi-mode terminal determines whether the indicator is set to an overlay area. If it is determined that the indicator is set to an overlay area, the multi-mode terminal activates the ping-pong timer in step 810 and determines in step 815 whether the ping-pong timer has expired. When the ping-pong timer expires, the multi-mode terminal determines in step 820 whether the multi-mode terminal is located in an overlay area. If it is determined that the multi-mode terminal is located in an overlay area, the multi-mode terminal generates a CALL DISCONNECT event in step 825. For example, if the indicator is set to '1', the multi-mode terminal determines whether the ping-pong timer for returning to a third generation (3G) service has expired, and if it is determined that the ping-pong timer has does not expired, the multi-mode terminal waits until the ping-pong timer expires. Since the user can move while the ping-pong timer is operating, when the ping-pong timer expires, the multi-mode terminal checks the indicator, and if the indicator is set to '1', the CALL DISCONNECT event is transmitted to the data application 470.

In step 830, the multi-mode terminal determines whether location registration succeeds, and if the location registration fails, the multi-mode terminal increases the ping-pong timer, determines whether the multi-mode terminal is located in an overlay area, and performs the location registration again. If the location registration succeeds in step 830, the multi-mode terminal performs a mode change in step 835. At this moment, the CDMA modem 440 deletes the IP address and QoS information assigned by the CDMA BTS 490.

In detail, the CDMA modem 440 changes a mode of the WCDMA modem 450 to an on-line mode and then performs the location registration through GMM ATTACH procedures with the WCDMA BTS 480. If the location registration fails, the multi-mode terminal cancels the WCDMA mode, returns to the CDMA mode, and increases the ping-pong timer in a predetermined manner. If the location registration succeeds, the WCDMA modem 450 transmits a WCDMA INSERVICE message for indicating activation of a WCDMA service to the data application 470. Then, when a request is input from the user, the data application 470 receives the WCDMA service by reconnecting a packet call to a WCDMA network.

As described above, a difference between the process of processing the dormant state in the CDMA mode and the process of processing the dormant state in the WCDMA mode is that IP address and QoS information assigned in the CDMA mode are deleted after the WCDMA service is obtained. This is because the method of processing the dormant state in the WCDMA mode has high possibility of failing in WCDMA location registration even in a 3G overlay area since the number of WCDMA serviceable areas is less than the number of CDMA serviceable areas. Thus, the present invention can be applied to WCDMA, GSM, and GPRS areas.

When the multi-mode terminal according to a preferred embodiment of the present invention moves to a bad communication area while the dormant timer is operating in the dormant state in the WCDMA mode, the multi-mode terminal can independently determine the time when the multi-mode terminal is out of the dormant state by monitoring signal intensity. In addition, by operating the ping-pong timer in the dormant state in the CDMA mode, when the multi-mode terminal moves to a bad communication area, the multi-mode terminal can change to another mode, thereby preventing a case where the user cannot be served.

As described above, according to the present invention, by improving a dormant state processing algorithm between a WCDMA system and a CDMA system when a multi-mode terminal performs a packet call and optimizing a structure of the multi-mode terminal, a seamless service can be provided to users in a boundary, shadow, or overlay area between heterogeneous systems, and an optimal service mode can be selected.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of processing a dormant state in a packet service, which is performed by a multi-mode terminal comprising first and second modems supporting different communication services, the method comprising:
   if it is determined that the multi-mode terminal has entered into the dormant state during a packet service through a first communication network, determining whether a command received from the first communication network corresponds to a command for connecting a packet call to a second communication network, requesting the first communication network to disconnect the packet call when it is determined that the command received from the first communication network corresponds to the command for connecting the packet call to the second communication network, monitoring whether an intensity of a signal of a communication state with the first communication network falls below a threshold value in the dormant state during a predetermined period when it is determined that the command received from the first communication network does not correspond to the command for connecting the packet call to the second communication network, wherein the dormant state is a state in which an application using the packet service is operating but not transmitting or receiving data to or from the first communication network;
   setting a count value if it is determined that the intensity of the signal during the predetermined period is less than the threshold;
   if the count value is equal to a threshold counting value, requesting the first communication network to disconnect the packet call;
   when it is determined that
   if the packet call with the first communication network is disconnected, turning on the second modem, by the first modem, through a communication path coupling the first and second modems;
   determining whether registration between the second modem and the second communication network succeeds; and
   if the registration succeeds, connecting a packet call to the second communication network by the second modem.

2. The method of claim 1, wherein the monitoring whether the intensity of the signal of the communication state with the first communication network falls below the threshold value comprises determining whether the multi-mode terminal is located in at least one of one of a shadow area, a boundary area, and an overlay area.

3. The method of claim 1, wherein the first communication network and the second communication network are a wideband code division multiple access (WCDMA) network and a code division multiple access (CDMA) network, respectively, and the first modem and the second modem process signals transmitted or received through the WCDMA network and the CDMA network, respectively.

4. The method of claim 1, wherein the first communication network is one of WCDMA, global systems for mobile communication (GSM), and general packet radio service (GPRS) networks, the second communication network is a code division multiple access (CDMA) network, the first modem processes signals transmitted or received through one of the WCDMA, GSM, and GPRS networks, and the second modem processes signals transmitted or received through the CDMA network.

5. A multi-mode terminal, comprising:
first and second modems supporting different communication services, for efficiently processing a dormant state in a packet service, the first modem for, when it is determined that the multi-mode terminal has entered into the dormant state during a packet service through a first communication network, determining whether a command received from the first communication network corresponds to a command for connecting a packet call to a second communication network, requesting the first communication network to disconnect the packet call if it is determined that the command received from the first communication network corresponds to the command for connecting the packet call to the second communication network, monitoring whether an intensity of signal of a communication state with the first communication network falls below a threshold value in the dormant state during a predetermined period if it is determined that the command received from the first communication network does not correspond to the command for connecting the packet call to the second communication network, wherein the dormant state is a state in which an application using the packet service is operating but not transmitting or receiving data to or from the first communication network, setting a count value if it is determined that the intensity of the signal during the predetermined period is less than the threshold, requesting the first communication network to disconnect a packet call if the count value is equal to a threshold counting value, turning on the second modem through a communication path coupling the first and second modems if the packet call with the first communication network is disconnected in response to the request; and
the second modem for determining whether registration between the second modem and the second communication network succeeds, and connecting the packet call to the second communication network if the registration succeeds.

6. The multi-mode terminal of claim 5, wherein the first modem determines whether the multi-mode terminal is located in at least one of a shadow area, a boundary area, and an overlay area in the dormant state.

7. The multi-mode terminal of claim 5, wherein the first communication network and the second communication network are a wideband code division multiple access (WCDMA) network and a code division multiple access (CDMA) network, respectively, and the first modem and the second modem process signals transmitted or received through the WCDMA network and the CDMA network, respectively.

8. The multi-mode terminal of claim 5, wherein the first communication network is one of WCDMA, global system for mobile communications (GSM), and general packet radio service (GPRS) networks, the second communication network is a code division multiple access (CDMA) network, the first modem processes signals transmitted or received through one of the WCDMA, GSM, and GPRS networks, and the second modem processes signals transmitted or received through the CDMA network.

9. A method of processing a dormant state in a packet service, which is performed by a multi-mode terminal having first and second modems supporting different communication services, the method comprising:
if it is recognized that the multi-mode terminal has entered the dormant state during a packet service in a first communication network mode, determining whether the multi-mode terminal is located in a communication area receiving a signal having a lower intensity than a threshold, in the dormant state, by determining whether a command for changing to a second communication network is set by checking a command received from the first communication network, activating a ping-pong timer if the command for changing to the second communication network is set, and repeating the determination of whether the multi-mode terminal is located in the communication area receiving the signal having the lower intensity than the threshold when the ping-pong timer expires, wherein the dormant state is a state in which an application using the packet service is operating but not transmitting or receiving data to or from the first communication network;
if it is determined that the multi-mode terminal is located in the communication area receiving the signal having the lower intensity than the threshold, commanding the second modem, through a communication path coupling the first and second modems, to perform location registration in the second communication network; the location registration succeeds, continuing performance of the packet service by changing to a second communication network mode and deleting an Internet Protocol (IP) address and Quality of Service (QoS) information assigned in the first communication network mode; and
canceling the change to the second communication network mode and returning to the first communication network mode if the location registration fails.

10. The method of claim 9, wherein the first communication network and the second communication network are a code division multiple access (CDMA) network and a wideband CDMA (WCDMA) network, respectively, and the first modem and the second modem process signals transmitted or received through the CDMA network and the WCDMA network, respectively.

11. The method of claim 9, wherein the first communication network is a code division multiple access (CDMA) network, the second communication network is one of wideband CDMA (WCDMA), global systems for mobile communication (GSM), and general packet radio service (GPRS) networks, the first modem processes signals transmitted or received through the CDMA network, and the second modem processes signals transmitted or received through one of the WCDMA, GSM, and GPRS networks.

12. A multi-mode terminal, comprising:
first and second modems supporting different communication services, for efficiently processing a dormant state in a packet service, the first modem for monitoring whether the multi-mode terminal is located in a communication area receiving a signal having a lower intensity than a threshold, in the dormant state if it is determined that the multi-mode terminal had entered into the dormant state during a packet service in a first communication network mode, wherein the dormant state is a state in which an application using the packet service is operating but not transmitting or receiving data to or from the first communication network, commanding the second modem through a communication path, which couples the first and second modems, to perform location registration in a second communication network if it is determined that the multi-mode terminal is located in the communication area receiving the signal having the lower intensity than the threshold, and deleting an Internet Protocol (IP) address and Quality of Service (QoS) information assigned in the first communication network mode if the location registration succeeds; and the second modem for performing the location registration in the second communication network in response to the command of the first modem and continuing performance of the packet service in a second communication network mode if the location registration succeeds, and canceling the change to the second communication network mode and returning to the first communication network mode if the location registration fails;

wherein the first modem determines whether a command for changing to the second communication network is set by checking a command received from the first communication network, activates a ping-pong timer if the command for changing to the second communication network is set, and repeats the determinations of whether the multi-mode terminal is located in the communication area receiving the signal having the lower intensity than the threshold, if the ping-pong timer expires.

13. The multi-mode terminal of claim 12, wherein the first communication network and the second communication network are a code division multiple access (CDMA) network and a wideband CDMA (WCDMA) network, respectively, and the first modem and the second modem process signals transmitted or received through the CDMA network and the WCDMA network, respectively.

14. The multi-mode terminal of claim 12, wherein the first communication network is a code division multiple access (CDMA) network, the second communication network is one of wideband CDMA (WCDMA), global system for mobile communication (GSM), and general packet radio service (GPRS) networks, the first modem processes signals transmitted or received through the CDMA network, and the second modem processes signals transmitted or received through one of the WCDMA, GSM, and GPRS networks.

* * * * *